(a) S COIL WAVEFORM
(b) DIFFERENTIATED
(c) BISTABLE O/P
(d) INTEGRATED FORM, NO SIGNAL
(e) INTEGRATED FORM, SIGNAL PRESENT

United States Patent Office 3,427,534
Patented Feb. 11, 1969

3,427,534
DEVICE FOR MEASURING THE MAGNITUDES OF UNIDIRECTIONAL MAGNETIC FIELDS
David James Maxwell, Bracknell, England, assignor, by mesne assignments, to Sperry Rand Limited, London, England, a company of England
Filed Feb. 15, 1966, Ser. No. 527,419
Claims priority, application Great Britain, Feb. 23, 1965, 7,748/65
U.S. Cl. 324—43
Int. Cl. G01r 33/02
4 Claims

ABSTRACT OF THE DISCLOSURE

A device for measuring the magnitude of an external unidirectional magnetic field in which the exciting current source is controlled in accordance with the effect of the unidirectional field on a magnetically permeable core which is magnetized first in one direction and then in the opposite so that the exciting current becomes asymmetrical about the time axis whereas in the absence of such external field it would be symmetrical. The D.C. component of the exciting current is therefore a measure of the strength of the external field along the axis of the core.

---

The invention relates to magnetometers and it is an object of the invention to provide a novel form of magnetometer.

A magnetometer according to the present invention comprises a saturable magnetic core carrying primary and secondary windings, switching means arranged to respond to a signal from the secondary winding, and to provide a voltage or current signal of rectangular waveform, an integrator arranged to integrate the rectangular wave-form signal to provide a current of sawtooth waveform in the primary winding, and means for isolating the D.C. component of the primary current to provide a measure of the external field applied to the core.

The core is preferably of ferro-magnetic material having a sharp saturation characteristic, such as mu-metal. The switching signal may be a bi-stable device or preferably a multivibrator arranged to have a free-running frequency less than the normal operating frequency of the magnetometer when switched by magnetization of the core. By this means the magnetometer will be self-starting even though it should fail to operate at its first switching point after power is applied. The switching circuit may be switched by pulses from a differentiating and pulse-amplifying circuit connected to the secondary winding.

Where a multivibrator is employed, a feed-back path for the integrated signal is preferably provided connected in such a sense as to balance the multivibrator in its free-running condition. By this means, if the magnetometer should fail to start into normal operation for several cycles during which the multivibrator is free-running, the build-up of an integrated voltage which would lock the magnetometer into one extreme condition is avoided.

The invention will be further described by way of example with reference to the accompanying drawings in which.

Figure 1:
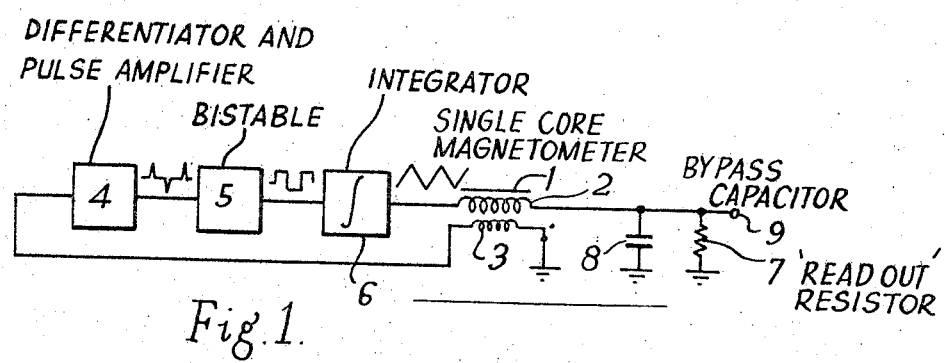
FIGURE 1 is a schematic diagram of one form of single-axis magnetometer according to the invention.

Referring first to FIGURE 1, the sensitive element of the magnetometer consists of a thin elongated core 1 of mu-metal bearing a primary winding 2 and a secondary winding 3. The output from the secondary winding 3 is applied to a differentiating and pulse-amplifying circuit 4 which provides pulses of alternate polarities to switch a bi-stable device 5.

The output voltage of the bi-stable device 5 is applied to an integrator 6 controlling the current through the primary winding 2 of the magnetometer. This current is returned to earth through a read-out resistor 7 shunted by a capacitor 8, the resistance and capacity respectively of these components being chosen to be sufficiently large to ensure that the voltage appearing across the resistor and therefore at output terminal 9 represents the steady D.C. component of the primary current. This component is a measure of the external field applied along the core 1 of the magnetometer.

Figure 2:
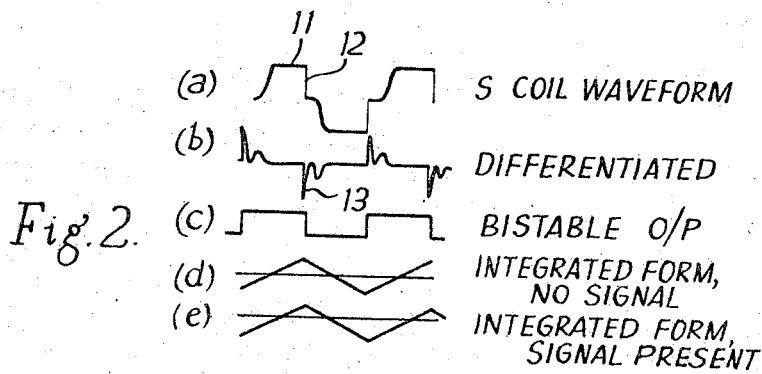
FIGURE 2 shows voltage and current wave-forms at various points of the circuit represented schematically in FIGURE 1.

The operation of the magnetometer will now be described with reference also to FIGURE 2.

When power is first applied to the circuit the current flowing through the primary coil to the magnetometer increases steadily at a uniform rate determined by the integrator 6. The flux in the core 1 increases proportionately and as it does so a constant voltage 11 (FIG. 2a) appears across the secondary winding 3 and is applied to the differentiating and pulse-amplifying circuit 4. When the core 1 reaches saturation the secondary voltage rapidly falls to zero 12 (FIG. 2a) and a pulse 13 (FIG. 2b) is generated by the differentiator and amplifier 4 and switches the bi-stable 5 into its other condition. The output from this bi-stable is shown in FIG. 2c.

This reverses the polarity of the signal applied to the integrator and causes the current through the primary winding 2 to start changing in the reverse sense.

The primary current continues to change until the core reaches saturation in its opposite sense of magnetization, whereupon the current in the secondary winding again falls abruptly to zero, and a pulse, this time of opposite polarity, is produced by the circuit 4 and switches the bi-stable 5 back again.

This sequence is repeated indefinitely at a frequency which depends mainly on the constant of the integrator 6 and on the properties of the core 1 and the geometry of its windings 2 and 3. FIG. 2a–d show the voltage waveforms respectively at the output of secondary winding 3, the differentiating and pulse-amplifying circuit 4, and the bi-stable 5, and the wave-form of the current supplied by the integrator 6 to the primary winding. In particular, the current in the primary winding 2 shown in FIG. 2d has a sawtooth wave-form whose amplitude is just sufficient to take the core to saturation in either sense. In the absence of any external field the current required for saturation in opposite senses will be equal and opposite, and the mean value of this current will be zero, so that a zero voltage with respect to earth will appear at the terminal 9 in FIG. 1.

If the core 1 of the magnetometer is subjected to an external field it will be magnetically polarized in one sense and a smaller current will be required to saturate it in this sense, and a correspondingly greater one to saturate it in the reverse sense. The primary current therefore becomes as is shown in FIG. 2e in an exaggerated form, having a D.C. component which is a measure of the applied field. A voltage corresponding to this D.C. component therefore appears across the resistor 7 and capacitor 8, and is measured at the terminal 9 to give a measure of magnetic field to which the core is subject.

It will be noted that the arrangement does not contain an independent oscillator whose frequency requires to be stabilized or controlled, and that the amplitude of oscillation is determined primarily by the magnetic properties of the core 1, and is relatively independent of the supply voltage, so that an unstabilized battery supply may be used.

Figure 3:
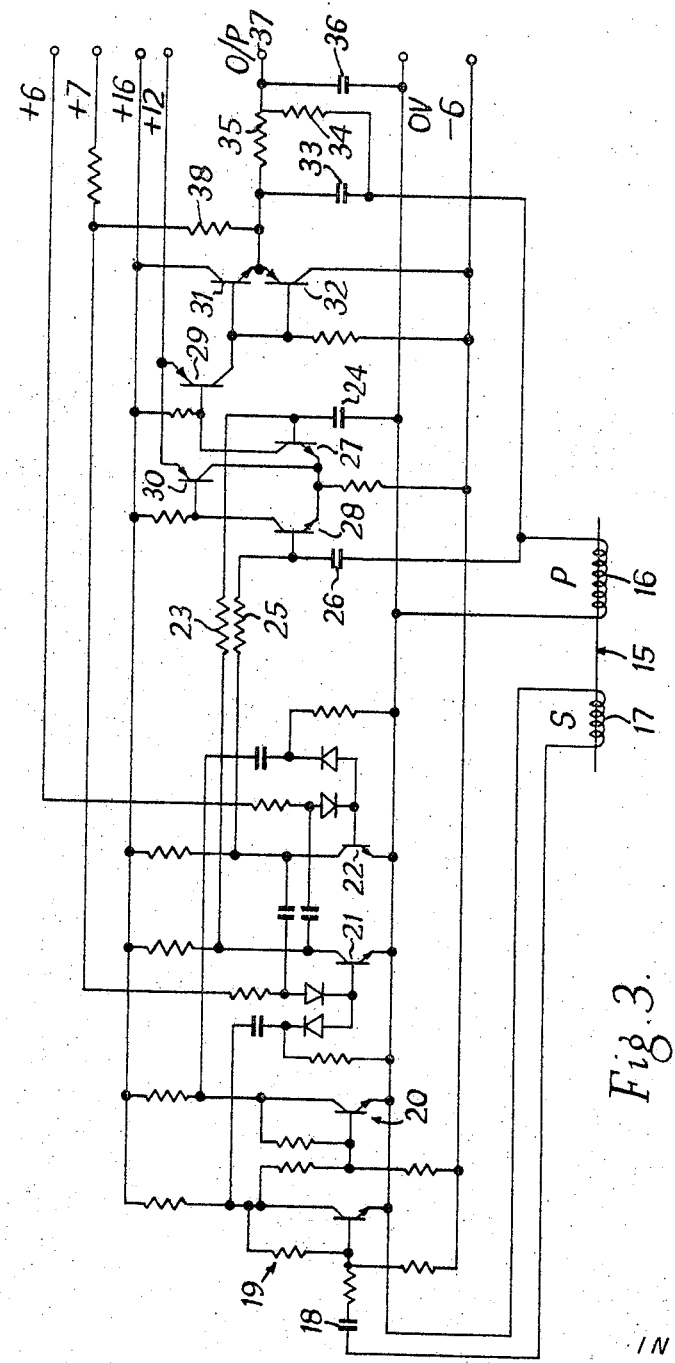
FIGURE 3 is a more detailed but nevertheless simplified diagram of an actual single-axis magnetometer, three of which may be combined with their magnetic cores arranged at right angles to each other to form a three-axis magnetometer.

FIGURE 3 is a simplified circuit diagram of an actual single-axis magnetometer according to the invention. A full three-axis magnetometer comprises three circuits, each similar to FIGURE 3 with the magnetic cores arranged at right-angles to each other. The circuit of FIGURE 3 is simplified by the omission of some diodes which in practice would be inserted for the protection of the transistors.

The magnetometer core 15 comprises a single mu-metal wire carrying a primary magnetising winding 16 and a secondary pick-off winding 17. The signal from the pick-off winding 17 is applied through a blocking capacitor 18 to a first amplifying stage 19, the output from which is inverted by a second transistor stage 20 having a voltage gain of unity.

Twin outputs from the stages 19 and 20 are applied to a pair of transistors 21, 22, cross-coupled by capacitors and resistors to form a multivibrator circuit of conventional design, and so designed as to have a natural free-running mode of oscillation at a frequency about half of that at which it functions when driven by magnetization of the core 15.

The output of the multivibrator is applied to a pair of integrating circuits comprising the resistor 23 with the capacitor 24 and the resistor 25 in series with the capacitor 26.

The voltages appearing at the junctions of the resistors and capacitors are amplified by a balanced transistor amplifier comprising a pair of transistor stages 27, 18 followed by a second pair of stages 29, 30 and an output stage 31, 32 consisting of a complementary pair of transistors connected as grounded-collector stages.

A feed-back path is provided from the output of the grounded collector stages 31, 32, the A.C. component passing through the blocking capacitor 33, back to the input via the capacitor 26, and the D.C. component being passed through a read-out resistor 34 and the primary coil 16 to earth. A series resistor 35 and a shunt capacitor 36 are provided to reduce the ripple component appearing at the output terminal 37, so that the voltage at this terminal represents substantially the D.C. voltage across the read-out resistor 34 in series with the resistance of the primary winding 16, and is therefore a measure of the D.C. component of the primary current.

A feed-back path is provided by connecting the output of the grounded collector stages 31, 32 through a resistor 38, to one side of the multivibrator 21.

In normal operation the multivibrator switches shortly after switching on and the output voltages produced are integrated, causing a steadily increasing current to flow through the primary coil 16 until the core 15 is saturated. When this occurs there is a change in the voltage of the pick-off coil 17, which is amplified by the stages 19 and 20 and switches the multivibrator to its other condition. Integration of the output voltage from the multivibrator now takes place in the opposite sense until the core 15 again reaches saturation and the multivibrator is switched back.

If, for any reason, the change of the voltage on the pick-off coil 17 should fail to produce switching, the multivibrator will in due course switch over of its own accord and restart the circuit into operation. If several cycles should occur in which the multivibrator operates in its free-running condition, the feed-back path through the resistor 38 will prevent the integrator or the core from becoming saturated and locked in one extreme condition since this feed-back path influences the mark/space ratio of the multivibrator in its free-running condition in such a sense as to equalize the two half cycles. When the multivibrator is functioning in its forced condition, determined by the magnetization of the core 15, the feed-back from the resistor 38 has negligible effect.

When the magnetometer is in operation any longitudinal field on the core 15 produces an asymmetry in the two half-cycles of the oscillation produced by feed-back between the primary and secondary windings 16 and 17 and this results in a D.C. component in the current through the primary coil 16.

The voltage dropped by this component across the read-out resistor 34 in series with the resistance of the coil 16 appears at the output terminal 37, where it provides a measure of the component of the magnetic field along the axis of the core.

A magnetometer of the kind described may also be used as a D.C. measuring instrument by making the core 15 in the form of a slotted ring which in use is arranged to encircle a wire carrying D.C. current. The magnetometer reading then provides a measure of the current through the wire. Alternatively the core 15 may be in the form of a toroid wound with a separate input winding for D.C. current so as to act as a D.C. isolator.

What is claimed is:
1. A device for measuring the magnitude of a unidirectional magnetic field comprising a magnetically permeable core member having primary and secondary windings wound along a chosen core axis, a square wave generator, an integrator connected to receive the square wave output of said generator and connected to supply its sawtooth wave output to said primary winding, control means for controlling said square wave generator having its input connected to said secondary winding, and means connected in circuit with said primary winding for determining the magnitude of the D.C. component of the exciting current flowing through said primary winding to thereby provide a measure of external field strength along said core axis.

2. The device recited in claim 1 in which the core is of a ferro-magnetic material having a sharp saturation characteristic.

3. The device recited in claim 1 in which the core member and exciting current power supply therefor are so constructed and arranged that the saw tooth exciting current in magnitude and frequency is such that it can run the core member into saturation in both directions.

4. A device for measuring the magnitude of a unidirectional magnetic field comprising a magnetically permeable core member having primary and secondary windings wound along a chosen core axis, a multivibrator for supplying a square wave output, an integrator connected to receive the square wave output of said multivibrator and connected to supply its sawtooth wave output to said primary winding, a differentiating circuit connected to receive the output of said secondary winding and connected in controlling relation to said multivibrator, and output circuit means including averaging means connected to receive the current flowing through said primary winding for supplying at its output a measure of the D.C.

component of the sawtooth wave to thereby provide a measure of the component of external field strength lying along said core axis.

References Cited

UNITED STATES PATENTS

| | | | |
|---|---|---|---|
| 1,524,285 | 1/1925 | Besag | 324—117 |
| 2,406,870 | 9/1946 | Vacquier | 324—43 |
| 2,729,781 | 1/1956 | Gilbert | 324—117 |
| 2,991,414 | 7/1961 | Tillman | 324—43 |
| 3,183,498 | 5/1965 | Midis | 324—117 |
| 3,258,687 | 6/1966 | Heppner | 324—43 |

RANDOLPH V. ROLINEC, *Primary Examiner.*

A. E. SMITH, *Assistant Examiner.*

U.S. Cl. X.R.

324—117, 127